A. S. KNAPP.
SCUFFLE HOE.
APPLICATION FILED FEB. 25, 1909.
935,116.
Patented Sept. 28, 1909.
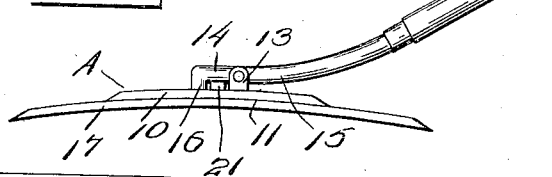
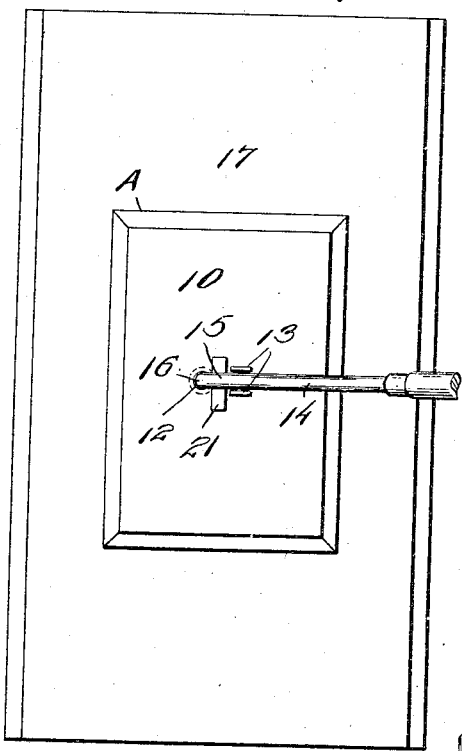
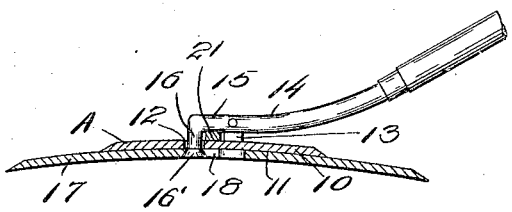
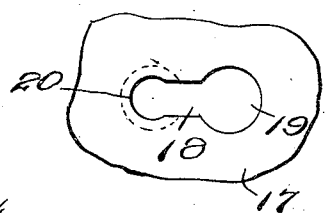
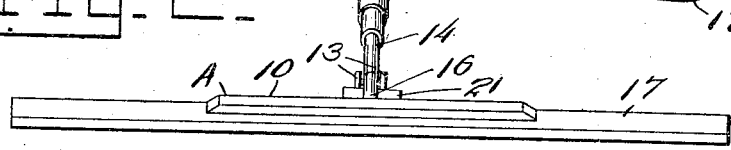
Witnesses
Inventor
A. S. Knapp,
By Woodward & Chandlee
Attorneys

UNITED STATES PATENT OFFICE.

ALBERT S. KNAPP, OF COOPERSTOWN, NEW YORK.

SCUFFLE-HOE.

935,116.  Specification of Letters Patent.  Patented Sept. 28, 1909.

Application filed February 25, 1909. Serial No. 479,925.

*To all whom it may concern:*

Be it known that I, ALBERT S. KNAPP, a citizen of the United States, residing at Cooperstown, in the county of Otsego and State of New York, have invented certain new and useful Improvements in Scuffle-Hoes, of which the following is a specification.

This invention relates to garden implements, and more particularly to hoes, and has for its object to provide a hoe especially adapted for use to remove grass or other growth from the ground surface.

A particular object of the device is to provide such an implement especially adapted for use on walks and driveways, for the removal of grass, and which may be operated with a minimum of effort to force it into engagement with the surface to be operated upon.

Another object is to provide a hoe having a blade adapted to be disposed approximately in horizontal position for use, and being curved to present opposite downwardly extending edge portions, which will tend to work beneath the surface of the ground, so that a minimum of effort is required for the perfect operation of the hoe.

A most important object of the invention is to provide a hoe of this kind having a detachable blade comprising simply a blank of sheet material.

Another important object is to provide a novel form of holder arranged to allow the disengagement of worn blades therefrom with facility and their rapid replacement with new blades.

Other objects and advantages will be apparent from the following description and it will be understood that changes in the specific structure shown and described may be made within the scope of the claims without departing from the spirit of the invention.

In the drawings forming a portion of this specification, and in which like numerals of reference indicate similar parts in the several views, Figure 1 is a side view of the hoe, in operative position, Fig. 2 is a top view of the device, Fig. 3 is a cross sectional view of the device, Fig. 4 is a plan view of a portion of the hoe blade, Fig. 5 is a front view of the device.

Referring to the drawings, there is shown a hoe comprising a holder portion A including a base plate 10 having an arcuately concaved lower face 11 and centrally perforated as at 12. Disposed laterally of the opening 12, there is an upwardly extending bifurcated support member 13 transversely perforated and having a clamping shank 14 pivotally supported therein, said shank having a horizontal portion 15 provided with a downwardly extending portion 16 disposed slidably through the opening 12, and having an enlarged head 16' at its lower end. The outer end of the member 14 is directed upwardly as shown in the drawings, and arranged for the engagement of a handle thereon in any suitable manner. Secured detachably to the under face of the plate 10 there is a blade 17 comprising a rectangular blank of sheet material having a central transverse slot 18 therein having an enlarged opening 19 at one end, and at the opposite end there is a circular countersunk area 20. The blade 17 is secured to the holder by the presentation of the head 16 downwardly through the opening 19, when the blade is moved laterally to move the portion 12 of the clamp shank longitudinally of the slot 18 for the engagement of the head 16 upwardly in the countersunk portion 18. A wedge member 21 is then engaged under the horizontal portion of the clamp between the support 13 and the downwardly extending portion of the clamp, when the blade 17 is drawn upwardly against the concaved face of the plate 10 causing it to conform to the arc of the under surface of the holder, the opposite longitudinal edges of the blade 17 thus being presented downwardly below the central portion of the blade and adapted for engagement with the surface of the ground in the usual manner. By this construction it will be seen that a blade of sheet material of a minimum thickness and strength may be utilized, the base plate 10 serving to brace the blade against buckling. The use of a thin blade for the purposes of a scuffle hoe is much more effective than the use of a thick one, and the effectiveness of the hoe is correspondingly increased.

The engaging edges of the hoe are preferably beveled upon their upper portions and the sharpening of the blade in this manner is facilitated by the manner of its engagement with the holder. The device is preferably made considerably wider than the usual hoe, as the resistance to its reciprocation is but slight.

What is claimed is:—

1. An article of the class described, comprising a holding member having an opening therethrough, a shank member pivoted thereon, and having a headed extension projecting through the opening, a blade having a slot therethrough enlarged at one end, said blade being engaged against the holding member with the headed end of the shank engaged outwardly of the reduced portion of the slot, and means for securing the headed end of the shank in clamping engagement against the blade, said shank being adapted for engagement with a handle.

2. A device of the class described, comprising a holder having a shank pivoted thereabove, said shank being adapted for engagement with a handle at one end and being provided with a headed downward extension at its other end projecting below the lower face of the holder, and a blade detachably engaged with the holder, said blade having a slot therethrough enlarged at one end for engagement over the headed extension and sliding movement to engage the head outwardly of the reduced portion of the slot, and means for detachably securing the headed portion of the extension in clamping engagement with the blade.

In testimony whereof I affix my signature, in presence of two witnesses.

ALBERT S. KNAPP.

Witnesses:
F. W. SPRAKER,
L. T. PIER.